(12) United States Patent
Bickham et al.

(10) Patent No.: US 8,538,219 B2
(45) Date of Patent: Sep. 17, 2013

(54) LARGE EFFECTIVE AREA OPTICAL FIBER WITH LOW BEND LOSS

(75) Inventors: Scott Robertson Bickham, Corning, NY (US); Dana Craig Bookbinder, Corning, NY (US); Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 281 days.

(21) Appl. No.: 12/915,388

(22) Filed: Oct. 29, 2010

(65) Prior Publication Data

US 2012/0106909 A1    May 3, 2012

(51) Int. Cl.
*G02B 6/02*    (2006.01)
(52) U.S. Cl.
USPC .......................................... 385/126
(58) Field of Classification Search
USPC .......................................... 385/126
See application file for complete search history.

(56) References Cited

U.S. PATENT DOCUMENTS

| | | | |
|---|---|---|---|
| 4,248,614 A * | 2/1981 | Scherer ........................ 65/405 |
| 4,913,521 A * | 4/1990 | Tajima et al. ................ 385/126 |
| 6,282,354 B1 * | 8/2001 | Jones et al. .................. 385/124 |
| 7,046,890 B2 * | 5/2006 | Sparks ......................... 385/127 |
| 7,106,934 B1 | 9/2006 | Mishra |
| 7,272,289 B2 | 9/2007 | Bickham et al. |
| 7,463,805 B2 * | 12/2008 | Li et al. ........................ 385/123 |
| 7,555,187 B2 * | 6/2009 | Bickham et al. ............. 385/127 |
| 7,876,990 B1 | 1/2011 | Mishra |
| 8,107,784 B2 * | 1/2012 | Borel et al. .................. 385/127 |
| 2008/0056654 A1 * | 3/2008 | Bickham et al. ............. 385/124 |
| 2010/0215329 A1 * | 8/2010 | Bickham et al. ............. 385/123 |
| 2011/0064368 A1 * | 3/2011 | Bookbinder et al. ........ 385/123 |
| 2011/0217011 A1 * | 9/2011 | Bennett et al. ............... 385/124 |

FOREIGN PATENT DOCUMENTS

| | | |
|---|---|---|
| EP | 1255138 A1 | 11/2002 |
| EP | 1477831 A1 | 11/2004 |
| EP | 1978383 A1 | 10/2008 |

OTHER PUBLICATIONS

U.S. Appl. No. 12/872,051, filed Aug. 31, 2010, Bickham, Scott Robertson, et al.

* cited by examiner

*Primary Examiner* — Charlie Peng
(74) *Attorney, Agent, or Firm* — Robert L. Carlson

(57) ABSTRACT

An optical fiber includes a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$; wherein $\Delta_{1MAX} > \Delta_4 > \Delta_2 > \Delta_3$. The difference between $\Delta_4$ and $\Delta_2$ is greater than 0.01% and profile volume, $|V_3|$ is at least 10%-$\mu m^2$. The fibers exhibit an effective area at 1550 nm which is greater than 110 $\mu m^2$.

21 Claims, 1 Drawing Sheet

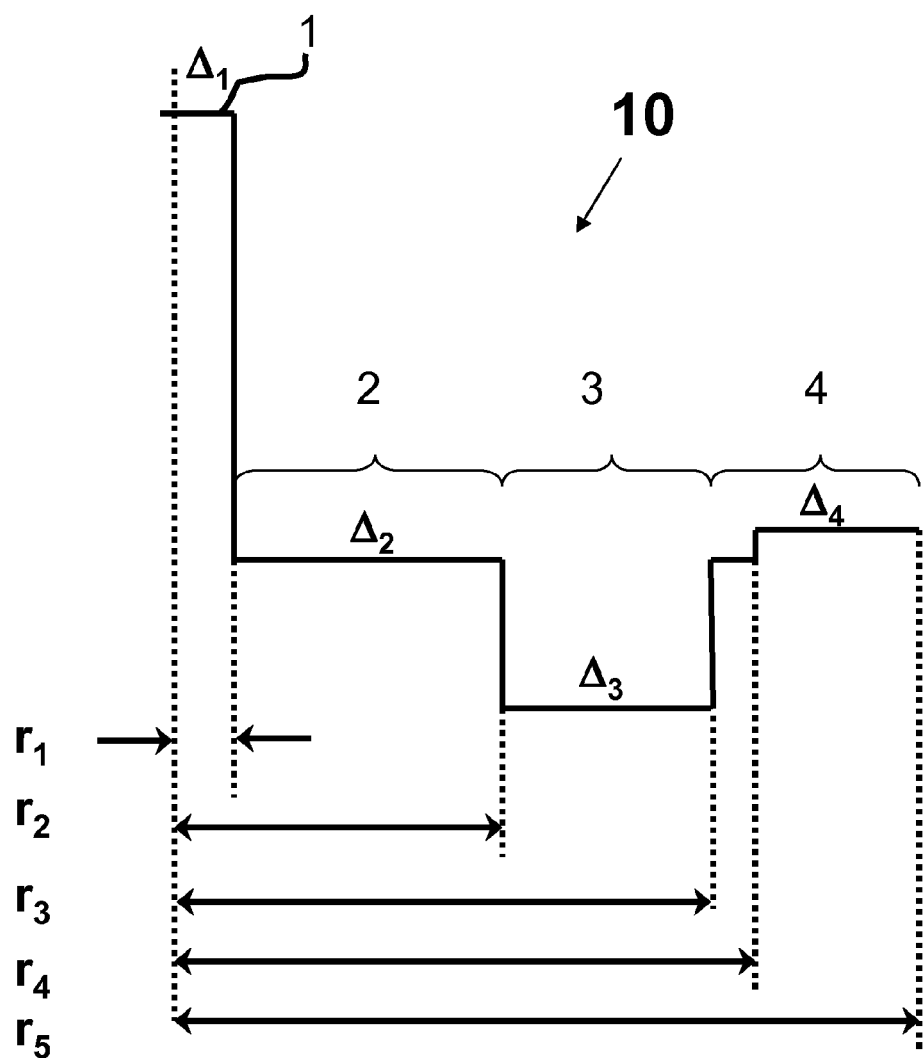

LARGE EFFECTIVE AREA OPTICAL FIBER WITH LOW BEND LOSS

BACKGROUND

The disclosure relates to optical fiber, and more particularly to single mode optical fibers which have large effective area and low bend loss at 1550 nm. Large effective optical fibers are attractive for long-haul telecommunication systems because they enable higher power signals to be used without increasing nonlinear effects such as self-phase modulation, four wave mixing and cross phase modulation. The higher signal power allows longer span lengths between costly repeaters and reduces the installed cost of the system. On the other hand, an increase in effective area of an optical waveguide fiber typically results in an increase in macrobending induced losses which attenuate signal transmission through a fiber. The macrobending losses become increasingly significant over long (e.g., 100 km, or more) distances (or spacing between regenerators, amplifiers, transmitters and/or receivers. Unfortunately, the larger the effective area of a conventional optical fiber is, the higher the macrobend induced losses tend to be.

SUMMARY

Single mode optical fibers are disclosed herein which include a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$, wherein $\Delta_{1MAX} > \Delta_4 > \Delta_2 > \Delta_3$.

In some embodiments, the difference between $\Delta_4$ and $\Delta_2$ is greater than 0.01% and the magnitude of the profile volume $|V_3|$ is at least 10%-$\mu m^2$. The fiber preferably exhibits an effective area at 1550 nm which is greater than 110 $\mu m^2$, more preferably greater than 120 $\mu m^2$, most preferably greater than 130 $\mu m^2$. The fiber preferably exhibits a cable cutoff less than 1500 nm, and a bend loss at 1550 nm, when wound on a 20 mm diameter mandrel, of less than 10.0 dB/turn, more preferably less than 5.0 dB/turn, even more preferably less than 2.0 dB/turn and most preferably less than 1.0 dB/turn.

In some preferred embodiments, the fiber core refractive index profile is designed so that the fiber exhibits a dispersion at 1550 nm less than 22.5 ps/nm/km, preferably less than 22.0 nm and a mode field diameter between about 10 and 15 $\mu m$, more preferably between 12 and 14 $\mu m$, at 1550 nm, and a cable cutoff less than 1500 nm.

The optical fiber may comprise a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$; said depressed annular region having a profile volume, $V_3$, equal to:

$$2 \int_{R_2}^{R_3} \Delta(r) r\, dr;$$

wherein the central glass core region comprises a maximum refractive index delta percent $\Delta_1$ and radius $r_1$ sufficient to result in a mode field diameter of greater than 11, more preferably greater than 12, and most preferably greater than 13 microns at 1550 nm, and wherein the magnitudes of the difference between $\Delta_4$ and $\Delta_2$ and the magnitude of $|V_3|$ are both sufficiently large to result in a 22 m cable cutoff less than 1500 nm and a bend loss at 1550 nm, when wound on a 20 mm diameter mandrel, of less than 10.0 dB/turn, more preferably less than 5.0 dB/turn, even more preferably less than 2.0 dB/turn, and most preferably less than 1.0 dB/turn. In some embodiments, the magnitudes of the difference between $\Delta_4$ and $\Delta_2$ is preferably greater than 0.01%, more preferably greater than 0.02%, even more preferably greater than 0.03%. In some embodiments the difference between $\Delta_4$ and $\Delta_2$ is greater than 0.04%. Preferably the difference between $\Delta_4$ and $\Delta_2$ is less than 0.1%. In some embodiments the difference between $\Delta_4$ and $\Delta_2$ is preferably greater than 0.01% and less than 0.1%. In some embodiments the difference between $\Delta_4$ and $\Delta_2$ is preferably greater than 0.01% and less than about 0.05%. The depressed annular region preferably comprises a profile volume $V_3$ such that $|V_3|$ is at least 10%-$\mu m^2$, although in some cases $|V_3|$ may be at least 20%-$\mu m^2$, at least 30%-$\mu m^2$, and in some cases greater than about 60%-$\mu m^2$. In some embodiments, the depressed annular region profile volume $V_3$ so that $|V_3|$ is less than about 120%-$\mu m^2$, more preferably less than about 100%-$\mu m^2$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 illustrates an exemplary refractive index profile of one exemplary embodiment of optical fiber.

DETAILED DESCRIPTION

Reference will now be made in detail to the present preferred embodiment(s), examples of which is/are illustrated in the accompanying drawings. Whenever possible, the same reference numerals will be used throughout the drawings to refer to the same or like parts.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, and as used herein $n_c$ is the average refractive index of undoped silica. As used herein, the relative refractive index is represented by $\Delta$ and its values are given in units of "%", unless otherwise specified. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "down-dopant" is herein considered to be a dopant which has a propensity to lower the refractive index relative to pure undoped $SiO_2$. Examples of updopants include $GeO_2$, $Al_2O_3$, $P_2O_5$, $TiO_2$, Cl, Br. Examples of down dopants include fluorine and boron.

"Chromatic dispersion", which may also be referred to herein as "dispersion", of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

The term "α-profile" or "alpha profile" refers to a relative refractive index profile, expressed in terms of $\Delta(r)$ which is in units of "%", where r is radius, which follows the equation, $$\Delta(r)=\Delta(r_o)(1-[|r-r_o|/(r_1-r_0)]^\alpha),$$

where $r_o$ is the point at which $\Delta(r)$ is maximum, $r_1$ is the point at which $\Delta(r)$ % is zero, and r is in the range $r_i < r < r_f$, where $\Delta$ is defined above, $r_i$ is the initial point of the α-profile, $r_f$ is the final point of the α-profile, and α is an exponent which is a real number.

Effective area" is defined as: $A_{eff}=2\pi(\int f^2 r \, dr)^2/(\int f^4 r \, dr)$, where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The mode field diameter (MFD) is measured using the Peterman II method wherein, 2w=MFD, and $w^2=(2\int f^2 \, r \, dr/\int [df/dr]^2 \, r \, dr)$, where f is the optical electric field amplitude and the integral limits are 0 to ∞.

The bend resistance of a waveguide fiber can be gauged by induced attenuation under prescribed test conditions, for example by deploying or wrapping the fiber around a mandrel of a prescribed diameter, e.g., by wrapping 1 turn around a 10 mm, or 20 mm or similar diameter mandrel (e.g. "1×10 mm diameter macrobend loss" or the "1×20 mm diameter macrobend loss") and measuring the increase in attenuation per turn.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

Cabled cutoff wavelength, or "cabled cutoff" as used herein means the 22 m cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP.

One exemplary fiber 10 is shown in FIG. 1, includes a central glass core region 1 comprising maximum refractive index delta percent $\Delta_1$. A first inner annular region 2 surrounds central core region 1, the first inner annular region 2 comprising refractive index delta percent $\Delta_2$. A depressed annular region 3 surrounds first inner annular region 2 and comprises $\Delta_3$. A third annular region 4 surrounds the depressed annular region 3 and comprises refractive index delta percent $\Delta_4$. In preferred embodiments, $\Delta_1 > \Delta_4 > \Delta_2 > \Delta_3$. In the embodiment illustrated in FIG. 1, regions 1, 2, 3, and 4 are immediately adjacent one another. However, this is not required, and alternatively additional core or cladding regions may be employed. For example, an outer cladding region (not shown) may be employed which surrounds annular region 4 and comprises a lower refractive index delta percent $\Delta_5$ than annular region 4.

Central core region 1 comprises an outer radius $r_1$ which is defined as the radius at which the relative refractive index first reaches a value of 0.03%. Core region 1 preferably exhibits a refractive index delta percent, $\Delta_1$, between about 0.1 to 0.25%, more preferably between about 0.15 to 0.23%. Core radius $r_1$ is preferably between 5 and 11 microns, more preferably between about 6 to 10.0 microns, even more preferably between about 6.5 to 8 microns. Central core region 1 is doped with germanium oxide in some preferred embodiments. In other embodiments, central core region 1 may be substantially free of germanium oxide. Central core region 1 preferably comprises an alpha between about 1 and 100, more preferably between 1 and 50 and even more preferably between 2 and 20.

In the embodiment illustrated in FIG. 1, first annular region 2 surrounds central core region 1 and comprises inner radius $r_1$, $r_1$ being defined as above. First annular region 2 has a maximum refractive index $\Delta_{2max}$, a minimum refractive index $\Delta_{2min}$, and refractive index $\Delta_2$ which is calculated using:

$$\Delta_2 = \frac{1}{(r_2-r_1)}\int_{r1}^{r2}\Delta(r)dr.$$

First annular region 2 has an outer radius $r_2$, defined as the radius at which the relative refractive index reaches a value of $(\Delta_{2max}+\Delta_3)/2$. In some cases the refractive index in region 2 is essentially flat, with $\Delta_{2max}-\Delta_2 \leq 0.01\%$. In other cases there can be a gradient index profile, with $0.01\% < \Delta_{2max}-\Delta_2 < 0.05\%$. Still in other cases there can be fluctuations as a result of small profile design or process variations. In some embodiments, the first annular portion comprises primarily silica which is substantially undoped with either fluorine or germania, i.e., such that the region is essentially free of fluorine and germania. In some other embodiments (e.g. when central core region is substantially free of germanium oxide), the first annular portion may comprise silica doped with fluorine in an amount sufficient to reduce the delta to between −0.25 and −0.1%. In some embodiments the central core region comprises alkali-doped silica wherein the alkali comprises potassium or sodium.

The first inner annular region preferably exhibits a width between about 1 to 10 microns, more preferably between about 1 to 7 microns. The ratio of the core radius $r_1$ to the radius $r_2$ of inner annular region 2 is preferably greater than 0.4, more preferably greater than 0.5, most preferably greater than 0.6. In some embodiments, Preferably, the ratio of the core radius $r_1$ to the radius $r_2$ of the inner annular region 2 is less than 1.0.

Depressed annular region 3 comprises inner radius $r_2$ and outer radius $r_3$, $r_3$ being defined as the radius at which the relative refractive index reaches a value of $(\Delta_3+\Delta_4)/2$. Depressed annular region 3 preferably comprises a delta percent between about −0.02 to −0.5%, more preferably −0.02% to −0.2%, even more preferably −0.03% to −0.15%, and most preferably −0.05% to −0.12%.

Depressed region 3 preferably comprises a width between about 10 and 25 microns and a profile volume, $V_3$, equal to:

$$V_3 = 2\int_{r2}^{r3} \Delta(r)rdr$$

Preferably, $|V_3|$ is 10%-μm², although in some cases $|V_3|$ may be at least 20%-μm², at least 30%-μm², and in some cases greater than about 60%-μm². In some cases it may be desirable to maintain the depressed annular region profile volume $V_3$ so that $|V_3|$ is less than 120%-μm², more preferably less than 100%-μm². Depressed annular region 3 comprises refractive index delta percent $\Delta_3$ which is calculated by $$\Delta_3 = \frac{1}{(r_3 - r_2)} \int_{r2}^{r3} \Delta(r)rdr.$$

The depressed-index annular portion may, for example, comprise glass comprising a plurality of voids, or glass doped with a downdopant such as fluorine, boron or mixtures thereof, or glass doped with one or more of such downdopants and additionally glass comprising a plurality of voids. In some preferred embodiments, the depressed-index annular portion is comprised of fluorine doped silica glass. In cases where the cladding includes voids, the voids in some embodiments may be non-periodically located within the depressed-index annular portion. By "non-periodically located", we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. It is believed that the voids extend along the length of the fiber a distance less than 20 meters, more preferably less than 10 meters, even more preferably less than 5 meters, and in some embodiments less than 1 meter. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein. As used herein, the diameter of a hole is the longest line segment whose endpoints are disposed on the silica internal surface defining the hole when the optical fiber is viewed in perpendicular cross-section transverse to the longitudinal axis of the fiber.

Third annular region 4 surrounds the depressed annular region 3 and comprises refractive index delta percent $\Delta_4$ which is higher than the index $\Delta_2$ of first annular region 2, thereby forming a region which is an "updoped" region 4 with respect to inner annular region 2. Note that it is not critical that region 4 be actually updoped in the sense that an index increasing dopant is included in region 4. Indeed, the same sort of "updoped" effect in annular region 4 may be achieved by downdoping inner annular region 2 with respect to annular region 4. The inner radius r4 of third annular region is defined as the point at which the higher refractive index region (compared to the refractive index of inner annular region 2) begins, i.e. the radius at which $\Delta_4$ first exceeds $\Delta_2$. In some embodiments, the higher index region of third annular region 4 may begin at the point where depressed annular region 3 ends, so that $r_3$ is equal to $r_4$. In some other embodiments, the beginning radial point $r_4$ of third annular region 4 (i.e., the region having a higher index than first annular region 2) may be spaced from the outer radial point $r_3$ of depressed annular region 3. The refractive index volume of region 4 is calculated by $$\Delta_4 = \frac{1}{(r_4 - r_3)} \int_{r3}^{r4} \Delta(r)dr.$$

Annular region 4 comprises a higher refractive index than first inner annular region 2. Preferably, the higher index portion (compared to first inner region 2) of annular region 4 extends to at least to the point where the optical power transmitted through the optical fiber is greater than or equal to 90% of the total optical power transmitted, more preferably to the point where the optical power transmitted through the optical fiber is greater than or equal to 95% of the total optical power transmitted, and most preferably to the point where the optical power transmitted through the optical fiber is greater than or equal to 98% of the total optical power transmitted. In preferred embodiments, the "updoped" third annular region extends at least to a radial point outside of where the majority of the light within the fiber is being transmitted, e.g., to at least a radial point of about 30 microns. Consequently, the volume $V_{4A}$ of the third annular region 4, which is defined as the volume calculated between the inner radius $R_4$ of the "updoped" third annular region 4 and r30 (a radial distance of 30 microns), is $$V_{4A} = 2\int_{r3}^{r30} (\Delta(r) - \Delta_2)rdr$$

Preferably, $V_{4A}$ is greater than 1, more preferably greater than 7, and in some embodiments greater than 10%-μm². The volume $V_{4A}$ of the third annular region 4 may be less than the volume $V_{4B}$ of the third annular region 4, volume $V_{4B}$ as used herein being calculated from $R_3$ to 62.5 microns (i.e., the outer radius of the 125 micron diameter fiber). In some cases, volume $V_{4B}$ may be greater than 80%-μm², greater than 100%-μm², or greater than 110%-μm², or greater than 130%-μm², or greater than 150%-μm², or greater than 200%-μm², or greater than 200 and less than 400%-μm².

Third annular region 4 may be spaced apart from annular region 3, as shown in FIG. 1, or alternatively annular region 4 may be immediately adjacent to the annular region 3. Annular region 4 may extend to the outermost radius of the optical fiber. In some embodiments, $\Delta_4$ of the third annular region is greater than 0.01%. In some embodiments, the refractive index $\Delta_4$ of the third annular region is greater than 0.01% when compared to that of the inner annular region 2. In some embodiments, the third annular region comprises chlorine (Cl) in an amount greater than 1000 ppm, more preferably greater than 1500 ppm, and most preferably greater than 2000 ppm (0.2%) by weight.

Examples

Various embodiments will be further clarified by the following examples. It will be apparent to those skilled in the art that various modifications and variations can be made without departing from the spirit or scope of the invention.

The tables below list characteristics of modeled illustrative examples 1-11 having a refractive index as shown in FIG. 1. In particular, set forth below for each example is the refractive index delta $\Delta_1$, alpha, and outer radius $R_1$ of the central core region 1, refractive index delta $\Delta_2$ and outer radius $R_2$ and width W2 of the inner annular region 2, outer radius $R_3$, refractive index delta $\Delta_3$, width W3 and volume $V_3$ of the second (depressed) annular region 3, refractive index delta $\Delta_4$, volume $V_{4A}$ of the third annular region 4, which is calculated between inner radius $R_4$ of third annular region 4, and a radial distance of 30 microns, volume $V_{4B}$ of the third annular region 4, which is calculated from $R_4$ to 62.5 microns (i.e., the outer diameter of the fiber). In all cases, the outer radius of the fiber is 125 microns. Also set forth are theoretical (LP11) cutoff wavelength in nm, mode field diameter at 1550 nm, effective area at 1550 nm, chromatic dispersion at 1550 nm, dispersion slope at 1550 nm, attenuation at 1550 nm, and 1×20 mm diameter induced bend loss in dB per turn at 1550 nm. In Table 1, these properties are modeled.

| Parameter | Example 1 | Example 2 |
|---|---|---|
| $\Delta 1$ (%) | 0.2 | 0.19 |
| R1 (μm) | 7.8 | 7.8 |
| Core Alpha | 20 | 20 |
| $\Delta 2$ (%) | −0.04 | −0.04 |
| R2 (μm) | 9.5 | 9 |
| $\Delta 3$ (%) | −0.11 | −0.08 |
| R3 (μm) | 29.5 | 29 |
| W2 (μm) | 1.7 | 1.2 |
| W3 (μm) | 20 | 20 |
| V3 (%-μm²) | 85.8 | 60.8 |
| $\Delta 4$ (%) | 0 | 0 |
| R4 (μm) | 29.5 | 29 |
| V4a (%-μm²) | 1.2 | 2.4 |
| V4b (%-μm²) | 121.4 | 122.6 |
| R1/R2 | 0.82 | 0.87 |
| Dispersion at 1.55 μm (ps/nm/km) | 22 | 21.8 |
| Dispersion Slope at 1.55 μm (ps/nm²/km) | 0.0634 | 0.063 |
| Aeff at 1.55 μm (μm²) | 159 | 162 |
| MFD at 1.55 μm (μm) | 13.76 | 13.98 |
| LP11 cutoff (um) | 1.510 | 1.476 |
| 1 × 20 mm bend loss at 1.55 μm (dB/turn) | 1.7 | 2.5 |
| Attn at 1.55 μm (dB/km) | 0.186 | 0.186 |

| Parameter | Example 3 | Example 4 | Example 5 | Example 6 | Example 7 |
|---|---|---|---|---|---|
| $\Delta 1$ % | 0.218 | 0.220 | 0.229 | 0.211 | 0.255 |
| R1 (μm) | 6.82 | 7.05 | 7.04 | 7.30 | 6.52 |
| Core Alpha | 9.1 | 9.9 | 8.8 | 11.2 | 9.0 |
| $\Delta 2$ % | −0.035 | −0.035 | −0.040 | −0.037 | −0.040 |
| R2 (μm) | 12.71 | 11.90 | 10.84 | 13.31 | 10.85 |
| $\Delta 3$ % | −0.119 | −0.110 | −0.119 | −0.134 | −0.150 |
| R3 (μm | 16.59 | 16.26 | 14.86 | 17.64 | 14.85 |
| W2 (μm) | 5.89 | 4.85 | 3.8 | 6.01 | 4.33 |
| W3 (μm) | 3.88 | 4.36 | 4.02 | 4.33 | 4.00 |
| V3 (%-μm²) | 13.53 | 13.51 | 12.29 | 17.96 | 15.42 |
| $\Delta 4$ (%) | 0 | 0 | 0 | 0 | 0 |
| R4 (μm) | 16.59 | 16.26 | 14.86 | 17.64 | 14.85 |
| V4a (%-μm²) | 21.9 | 22.2 | 27.2 | 21.8 | 27.2 |
| V4b (%-μm²) | 127.1 | 127.5 | 147.4 | 133.0 | 147.4 |
| R1/R2 | 0.54 | 0.59 | 0.65 | 0.55 | 0.60 |
| Dispersion at 1.55 μm (ps/nm/km) | 20.71 | 21.06 | 21.16 | 21.24 | 10.93 |
| Dispersion Slope at 1.55 μm (ps/nm²/km) | 0.062 | 0.062 | 0.062 | 0.063 | 0.062 |
| Aeff at 1.55 μm (μm²) | 131.2 | 135.4 | 129.7 | 144.0 | 115.1 |
| MFD at 1.55 μm (μm) | 12.86 | 13.00 | 12.70 | 13.21 | 11.99 |
| LP11 cutoff (μm) | 1.356 | 1.412 | 1.410 | 1.444 | 1.393 |
| 1 × 20 mm bend loss at 1.55 μm (dB/turn) | 4.3 | 3.4 | 2.9 | 3.4 | 1.7 |
| Attn1.55 μm (dB/km) | 0.187 | 0.187 | 0.187 | 0.186 | 0.187 |

| Parameter | Example 8 | Example 9 |
|---|---|---|
| $\Delta 1$ % | 0.3 | 0.3 |
| R1 (μm) | 11 | 11 |
| Core Alpha | 2 | 2 |
| $\Delta 2$ % | −0.060 | −0.060 |
| R2 (μm) | 12.53 | 12.53 |
| $\Delta 3$ % | −0.48 | −0.21 |
| R3 (μm) | 18 | 23 |
| W2 (μm) | 1.53 | 1.53 |
| W3 (μm) | 5.47 | 10.47 |
| V3 (%-μm²) | −80 | −78 |
| $\Delta 4$ (%) | 0 | 0 |
| R4 (μm) | 18 | 23 |
| V4a (%-μm²) | 34.6 | 22.3 |
| V4b (%-μm²) | 214.9 | 202.6 |
| R1/R2 | 0.88 | 0.88 |
| LP11 cutoff (μm) | 1534 | 1545 |
| Dispersion at 1.55 μm (ps/nm/km) | 21.58 | 21.33 |
| Dispersion Slope at 1.55 μm (ps/nm²/km) | 0.066 | 0.066 |
| Aeff at 1.55 μm (μm²) | 152.8 | 154 |
| MFD at 1.55 μm (μm) | 13.93 | 14.02 |
| 1 × 20 mm bend loss at 1.55 μm (dB/turn) | 1.55 | 1.3 |
| Attn1.55 μm (dB/km) | 0.183 | 0.183 |

The fibers listed above exhibit a modeled theoretical (LP11) cutoff wavelength which is less than 1550 nm. All of these fibers would exhibit a cable (22 m) cutoff wavelength less than 1500 nm. These examples illustrate that it is possible to achieve large effective area and still have dispersion at 1550 nm which is less than 22.5 ps/nm/km, more preferably less than 22 ps/nm/km and most preferably less than 21 ps/nm/km. All of these fibers have a germania-doped silica core; the attenuation shown for these examples ranges from 0.183 to 0.187 dB/Km. Identical fiber profiles modeled using a germania-free, alkali-doped silica core with fluorine doping in the annular regions, have essentially idential optical parameters and a attenuation of 0.158-0.165 dB/Km. These exemplary designs show fibers with large effective area greater than 110 μm², dispersion below 22 ps/nm/km and macrobending losses are reduced as a result of the inner annular region having a lower refractive index than the outer cladding region. These examples employ a central glass core region having index $\Delta_1$, a first inner annular region having index $\Delta_2$, a depressed annular region having index $\Delta_3$ and a third annular region having index delta percent $\Delta_4$; wherein $\Delta_1 > \Delta_4 > \Delta_2 > \Delta_3$, wherein the difference between $\Delta_4$ and $\Delta_2$ is greater than or equal to 0.01% and an absolute value of profile volume, $|V_3|$ is at least 10%-μm². These fibers exhibit a cable cutoff less than 1500 nm and a bend loss of less than 10.0 dB/turn when wound on a 20 mm diameter mandrel.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. An optical fiber comprising:
a central glass core region comprising maximum refractive index delta percent $\Delta_{1max}$, a first inner annular region immediately adjacent to and surrounding said core comprising refractive index delta percent $\Delta_2$, a depressed annular region surrounding said inner annular region and comprising refractive index delta percent $\Delta_3$, and a third annular region surrounding the depressed annular region comprising refractive index delta percent $\Delta_4$; wherein $\Delta_{1MAX} > \Delta_4 \Delta > \Delta_2 > \Delta_3$, wherein the difference between $\Delta_4$ and $\Delta_2$ is greater than or equal to 0.01% and a profile volume, $V_3$, equal to:

$$V_3 = 2 \int_{r2}^{r3} \Delta(r) r dr$$

where $r_2$ is the inner radius and $r_3$ is the outer radius of the depressed annular region and wherein $|V_3|$ is at least 10%-$\mu m^2$, and said fiber exhibits an effective area at 1550 nm which is greater than 110 $\mu m^2$.

2. The fiber of claim 1, wherein the depressed annular region of said fiber comprises a $\Delta_3$ between −0.02 and −0.5% and said fiber exhibits a cable cutoff less than 1500 nm.

3. The optical fiber of claim 1, wherein said fiber exhibits a bend loss of less than 10.0 dB/turn when wound on a 20 mm diameter mandrel.

4. The optical fiber of claim 1, wherein the difference between $\Delta_4$ and $\Delta_2$ is greater than 0.02%.

5. The optical fiber of claim 1, wherein the volume $V_4$ of the third annular region 4, when calculated from the inner radius of annular region 4 to a radial distance of 30 microns from the centerline of the fiber, is greater than 1%-$\mu m^2$.

6. The optical fiber of claim 2, wherein the volume $V_4$ of the third annular region 4, when calculated as $$V_3 = 2 \int_{r2}^{r3} \Delta(r) r dr$$

from the inner radius of annular region 4 to a radial distance of 30 microns from the centerline of the fiber, is greater than 1%-$\mu m^2$.

7. The optical fiber of claim 1, wherein the difference between $\Delta_4$ and $\Delta_2$ is less than about 0.05%.

8. The optical fiber of claim 1, wherein said fiber exhibits a ratio of core radius $r_1$ to radius $r_2$ of the first annular region which is greater than 0.4.

9. The optical fiber of claim 1, wherein said fiber comprises a profile volume, $|V_3|$ of at least 20%-$\mu m^2$.

10. The optical fiber of claim 9, wherein said fiber exhibits a bend loss at 1550 nm wavelength of less than 5.0 dB/turn on a 20 mm diameter mandrel.

11. The optical fiber of claim 1, wherein said fiber exhibits ratio of core radius $r_1$ to radius $r_2$ of first the annular region which is greater than 0.6.

12. The optical fiber of claim 9, wherein said fiber exhibits a 22 m cable cutoff less than 1500 nm.

13. The optical fiber of claim 1, wherein said fiber exhibits a 22 m cable cutoff less than 1450 nm.

14. The optical fiber of claim 1, wherein $\Delta_4$ of the third annular region is greater than 0.01%.

15. The optical fiber of claim 13, wherein the third annular region comprises Cl in an amount greater than 2000 ppm.

16. The optical fiber of claim 1, wherein the third annular region extends at least to the point where the optical power transmitted through the optical fiber is greater than or equal to 90% of the total optical power transmitted along the fiber.

17. An optical fiber comprising a central glass core region comprising maximum refractive index delta percent $\Delta_1$, a first inner annular region immediately adjacent to and surrounding said core comprising refractive index delta percent $\Delta_2$, a depressed annular region surrounding said inner annular region and comprising refractive index delta percent $\Delta_3$ and a third annular region surrounding the depressed annular region comprising refractive index delta percent $\Delta_4$; said depressed annular region having a profile volume, $V_3$, equal to:

$$V_3 = 2 \int_{r2}^{r3} \Delta(r) r dr$$

where $r_2$ is the inner radius and $r_3$ is the outer radius of the depressed annular region and wherein the central glass core region comprises a maximum refractive index delta percent $\Delta_1$ and radius $r_1$ sufficient to result in a mode field diameter at 1550 nm which is greater than 12.0 $\mu m$, and wherein the magnitudes of the difference between $\Delta_4$ and $\Delta_2$ and the magnitude of $|V_3|$ are both sufficiently large to result in a 22 m cable cutoff less than 1500 nm and a bend loss at 1550 nm wavelength of less than 10.0 dB/turn on a 20 mm diameter mandrel.

18. The optical fiber of claim 17, further comprising an effective area at 1550 nm which is greater than 110 $\mu m^2$ and wherein the depressed annular region of said fiber comprises a $\Delta_3$ between −0.02 and −0.5%.

19. The optical fiber of claim 17, wherein said fiber further comprises a ratio of core radius $r_1$ to radius $r_2$ of the first annular region which is greater than 0.4

20. The optical fiber of claim 17, wherein the volume $V_4$ of the third annular region 4, when calculated from the inner radius of annular region 4 to a radial distance of 30 microns from the centerline of the fiber, is greater than 1%-$\mu m^2$.

21. The optical fiber of claim 18, wherein said fiber further comprises a ratio of core radius $r_1$ to radius $r_2$ of the first annular region which is greater than 0.6.

* * * * *